UNITED STATES PATENT OFFICE.

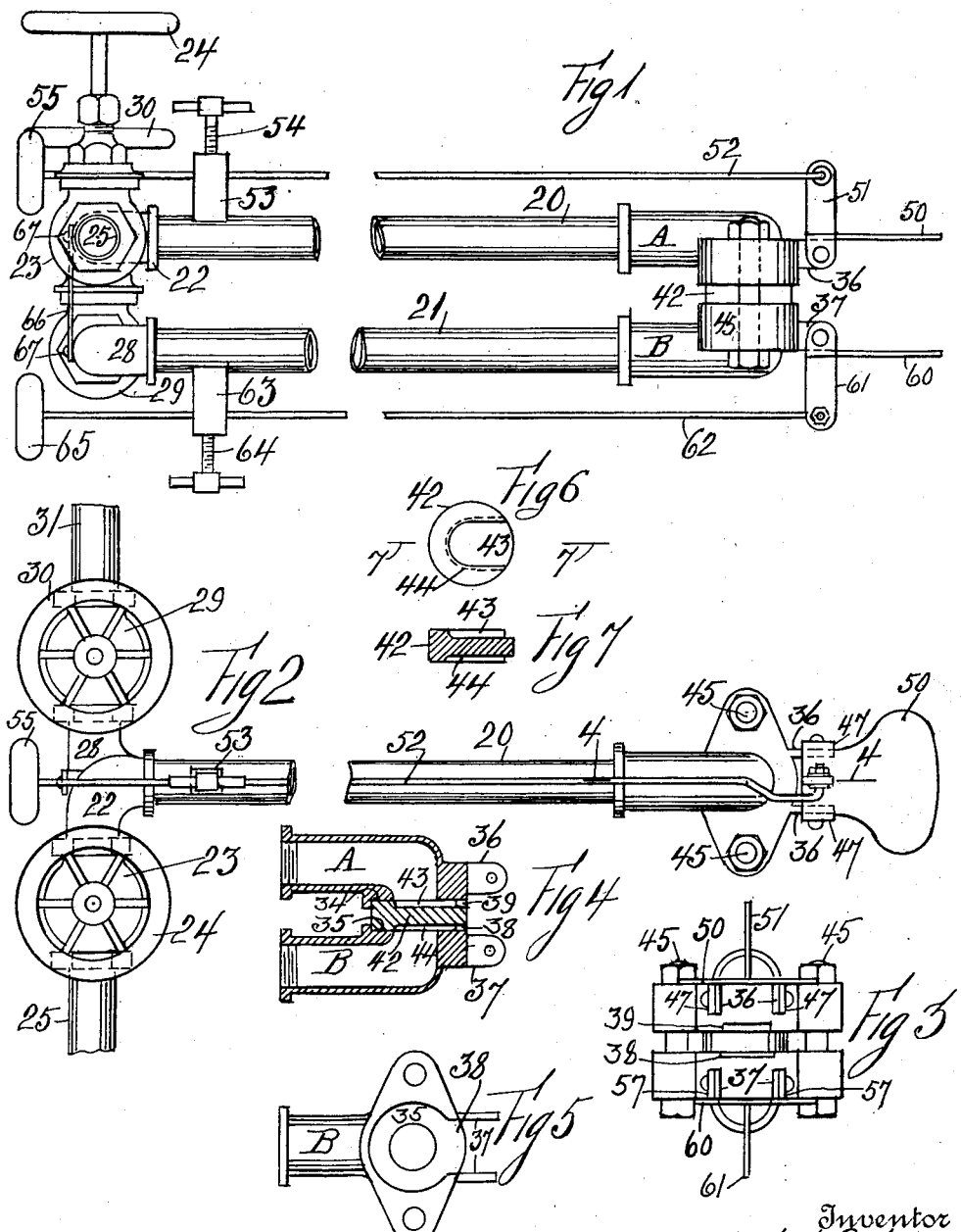

RAPPEL SCHAWROW, OF BAYONNE, NEW JERSEY.

LIQUID-FUEL BURNER.

1,384,781.  Specification of Letters Patent.  Patented July 19, 1921.

Application filed July 30, 1919. Serial No. 314,316.

*To all whom it may concern:*

Be it known that I, RAPPEL SCHAWROW, citizen of the United States, and resident of Bayonne, in the county of Hudson and State of New Jersey, have invented certain new and useful Improvements in Liquid-Fuel Burners, of which the following is a specification.

This invention relates to a liquid fuel burner and its organization comprises a pair of chambers, one for oil and the other for steam. Each chamber is provided with a port. An adjustable wing is hinged adjacent to each port to control the direction of discharge of the oil and steam after they leave the said ports.

In the drawings Figure 1 represents a side elevation of a burner, exemplifying the invention; Fig. 2 shows a top plan view of Fig. 1; Fig. 3 is a partial right hand end view of Fig. 1; Fig. 4 represents a section of Fig. 2 on the line 4, 4; Fig. 5 shows a top plan view of a member of Fig. 4, Fig. 6 represents a top plan view of a separating plug and Fig. 7 is a section of Fig. 6 on the line 7, 7.

The burner comprises the oil pipe 20 below which is located the steam pipe 21. An elbow 22 connects the pipe 20 with the adjusting valve 23 having the operating handwheel 24. Oil supply piping 25 connects with the inlet end of the valve 23. An elbow 28 connects the pipe 21 with the adjusting valve 29 having the operating hand wheel 30. Steam supply piping 31 connects with the inlet end of the valve 29. At the outlet ends of the pipes 20 and 21 there are respectively connected the similar chambers A and B. Each of said chambers has formed therewith the similar seats 34 and 35. Lugs 36 extend from the outer surface of the chamber A and lugs 37 extend from the outer surface of the chamber B. An outlet port 38 for steam is formed with the chamber B and a similar outlet port 39 for oil is formed with the chamber A. The port 38 is less in height than the port 39, but is somewhat wider than said port 39. A separating disk 42 is seated in the seats 34 and 35. The disk 42 has formed on its upper face a port 43 which registers with the port 39, and on its lower face is formed a port 44 which registers with the port 38. Bolts 45 engage openings in the chambers A and B and clamp the latter with the disk 42 together. To the lugs 36 are hinged ears 47 that have formed therewith an adjusting and deflecting wing 50, which latter is beyond and spaced from the outlet port 39. An arm 51 extends from the wing 50. An adjusting rod 52 has one end connected to the arm 51 and its other end is adjustably clamped in the clamping block 53 having the clamping screw 54. A disk handle 55 is attached to the outer end of the adjusting rod 52. To the lugs 37 are hinged ears 57 similar to 47. The ears 57 carry a wing 60 similar to 50 and which is beyond and spaced from the outlet port 38. An arm 61 similar to 51 extends from the wing 60. An adjusting rod 62 similar to 52 has one end connected to the arm 61 and its other end is adjustably clamped in the clamping block 63, similar to 52 and which has the clamping screw 64. A disk handle 65 is attached to the outer end of the adjusting rod 62.

The elbows 22 and 28 are connected by the strap 66 by means of the screws 67.

To operate the burner steam is supplied by the piping 25 and oil is supplied by the piping 31. The steam enters the pipe 21 and the oil enters the pipe 20. The steam is normally discharged in a horizontal flat stream through the steam ports 44 and 38 and the oil is normally discharged through the oil ports 43 and 39 in a horizontal flat stream. The streams of oil and steam travel outwardly between the adjustable wings 50 and 60 and mix one with another by the coaction of said wings after being discharged from the outlet ports 39 and 38, the steam forming a supporting film for the film of oil. The wings 50 and 60 are capable of being located at different angles, and both may be tilted upwardly or downwardly or one may be tilted upwardly and the other downwardly, so that the flame of burning oil may be directed in different angles. When the wing 60 inclines upwardly the stream of steam impinges against it and is spread and the stream of oil falls into and mixes with the stream of steam. To obtain this result the upper wing 50 is slightly inclined downwardly.

Having described my invention what I desire to secure by Letters Patent and claim is:

1. In a liquid fuel burner the combination of a pipe for a vaporizing agent and a liquid fuel pipe, an outlet port coacting with each pipe and an adjustable wing spaced from each port to control the direction and mixture of the discharged liquid fuel and vaporizing agent after being discharged from their outlet ports.

2. In a liquid fuel burner the combination of a steam pipe and a liquid fuel pipe, a separating disk with a port for the steam pipe and a port for liquid fuel pipe between the two pipes and an adjustable wing outside of and spaced from each of said ports, said wings adapted to deflect the stream of the mixture discharged from the ports of the burner by contacting with its upper or lower surface.

3. In a liquid fuel burner the combination of a pipe for liquid fuel, a pipe for a vaporizing agent below the first pipe, a chamber at the outlet end of each pipe, each of said chambers having a seat, the said seats opposite each other, each of said chambers having an outlet port, a separating disk with a port in each of its opposite flat faces seated in said seats and a wing hinged to each chamber beyond and spaced from its outlet port.

4. In a liquid fuel burner the combination of a pipe for the liquid fuel, a pipe for a vaporizing agent below the first pipe, a valve coacting with the inlet end of each pipe, a chamber at the outlet end of each pipe, each of said chambers having an outlet port, a separating disk with a port in its opposite faces bearing between said chambers, the ports in the disk registering with the ports in the chambers, a wing hinged to each chamber enabled to be located in the path of the discharge from its outlet port spaced from said port and means to maintain the wings in different tilted positions.

5. In a liquid fuel burner the combination of a pipe for liquid fuel and a pipe for a vaporizing agent adjacent to the first pipe, a valve coacting with each of said pipes, a chamber with an outlet port at the outlet end of each pipe, a separating disk with ports registering with the ports in the chambers located between the chambers and detachably connected thereto, a wing hinged to each chamber beyond and spaced from its port, an arm extending from each wing, an adjusting rod for each wing with one end hinged thereto and adjustable means to clamp the adjusting rods in different positions and thereby maintain the wings in different tilted positions to direct the stream of the mixture discharged from the ports of the burner downwardly or upwardly.

6. In a liquid fuel burner the combination of a pipe for liquid fuel and a pipe for a vaporizing agent, piping connected to each pipe, an adjusting valve in each of said piping, a chamber with an outlet port at the outlet end of each pipe, a separating disk with a pair of ports detachably connected to said chambers, the ports in the disk registering with the adjacent ports in the chambers, bolts connecting the chambers and the disk, a wing hinged to each chamber spaced from its outlet port and means to adjust said wings to incline upwardly or downwardly.

Signed at Bayonne, in the county of Hudson and State of New Jersey, this 25th day of July, A. D. 1919.

RAPPEL SCHAWROW.